(12) United States Patent
Sudou

(10) Patent No.: US 10,465,785 B2
(45) Date of Patent: Nov. 5, 2019

(54) DIFFERENTIAL CASE

(71) Applicant: GKN Driveline Japan Ltd, Tochigi, Tochigi (JP)

(72) Inventor: Noriyuki Sudou, Tochigi (JP)

(73) Assignee: GKN Driveline Japan Ltd, Tochigi (JP)

( * ) Notice: Subject to any disclaimer, the term of this patent is extended or adjusted under 35 U.S.C. 154(b) by 218 days.

(21) Appl. No.: 15/684,968

(22) Filed: Aug. 24, 2017

(65) Prior Publication Data

US 2017/0350490 A1 Dec. 7, 2017

Related U.S. Application Data

(63) Continuation of application No. PCT/JP2015/068020, filed on Jun. 23, 2015.

(51) Int. Cl.
*F16H 48/40* (2012.01)
*F16H 48/08* (2006.01)

(52) U.S. Cl.
CPC ............. *F16H 48/40* (2013.01); *F16H 48/08* (2013.01)

(58) Field of Classification Search
CPC ..... F16H 2048/382; F16H 48/40; F16H 48/08
See application file for complete search history.

(56) References Cited

U.S. PATENT DOCUMENTS

| | | | | |
|---|---|---|---|---|
| 4,612,825 | A * | 9/1986 | Engle | F16H 48/08 29/434 |
| 5,951,431 | A * | 9/1999 | Downs | F16H 48/08 475/230 |
| 7,320,659 | B2 * | 1/2008 | Pritchard | F16H 48/08 475/220 |
| 7,780,565 | B2 | 8/2010 | Fusegi et al. | |
| 7,827,882 | B2 * | 11/2010 | Kohno | F16H 48/08 475/230 |
| 2005/0070394 | A1 | 3/2005 | Sugeta et al. | |
| 2006/0084546 | A1 | 4/2006 | Kohno et al. | |
| 2008/0015076 | A1 | 1/2008 | Fusegi et al. | |

(Continued)

FOREIGN PATENT DOCUMENTS

| | | |
|---|---|---|
| CN | 102979881 A | 3/2013 |
| CN | 203637459 U | 6/2014 |

(Continued)

OTHER PUBLICATIONS

International Search Report and Written Opinion for PCT/JP2015/068020 dated Sep. 29, 2015 (9 pages; with English translation).

(Continued)

*Primary Examiner* — Sherry L Estremsky
(74) *Attorney, Agent, or Firm* — Bejin Bieneman PLC

(57) ABSTRACT

A differential case is comprised of: an outer peripheral wall cylindrical about a first axis; a first side wall being perpendicular to the first axis and having a flange; a second side wall having an outer side surface perpendicular to the first axis and being opposed to the first side wall; and an opening opened on the outer peripheral wall so as to allow side gears to be brought in the opening, the opening being so shaped that outlines of pinion gears do not touch a periphery of an oval as an outline of the opening in a case where an axis of the pinion gears is aligned with the center of the oval.

8 Claims, 5 Drawing Sheets

(56) References Cited

U.S. PATENT DOCUMENTS

| | | |
|---|---|---|
| 2008/0229878 A1 | 9/2008 | Kohno et al. |
| 2009/0239698 A1 | 9/2009 | Krude et al. |
| 2010/0093483 A1* | 4/2010 | Krude .................... F16H 48/08 |
| | | 475/244 |
| 2019/0128397 A1* | 5/2019 | Yanase .................... F16H 48/08 |

FOREIGN PATENT DOCUMENTS

| | | |
|---|---|---|
| CN | 203979360 U | 12/2014 |
| CN | 101994811 A | 10/2015 |
| EP | 1717486 A2 | 11/2006 |
| JP | H11-30315 A | 2/1999 |
| JP | 2005-214347 A | 8/2005 |
| JP | 2008008460 A | 1/2008 |
| JP | 2008-542635 A | 11/2008 |
| WO | 2004013519 A1 | 2/2004 |

OTHER PUBLICATIONS

Extended European Search Report of Application No. EP15896296.9 dated Feb. 5, 2019 (11 pages).

\* cited by examiner

DIFFERENTIAL CASE

CROSS-REFERENCE TO RELATED APPLICATIONS

This application is a continuation of, and claims priority to, Patent Cooperation Treaty Application No. PCT/JP2015/068020, filed on Jun. 23, 2015, which application is hereby incorporated herein by reference in its entirety.

BACKGROUND

As is well known, a vehicle is comprised of one or more differential gears and each of them is comprised of a differential gear set for allowing output shafts to make differential motion, which transmits torque put into a differential case to the pair of output shafts for example.

How to install a differential gear set and a pinion shaft combining the gear set with a case into the case is a problem. One solution is to make the case dividable into plural pieces and, by dividing it, provide a wide opening for installation with the case. This solution, however, creates some drawbacks in cost and weight as it causes an increase in a number of parts and necessitates additional parts for combining them. Another solution is to form a wide entrance on an outer periphery of the case of a single piece and bring the gear set into the interior therethrough.

The following documents disclose related art.

Japanese Patent Application Laid-open No. H11-30315
U.S. Pat. No. 7,780,565

SUMMARY

The present disclosure relates to a differential device and in particular to a differential case allowing a bulky differential gear set to be brought therein although it belongs to a so-called one-piece type that cannot be divided into plural pieces.

An outer peripheral wall of the case is an important strength member that bears input torque and it is therefore critically influential on a capacity of the differential device to form a wide opening thereon. Of particular note is that a wider opening is required when a capacity of the gear set for bearing the torque is to be improved, but the wider opening diminishes the capacity of the case. The present disclosure provides a solution to this technical problem.

According to an aspect, a case housing a pair of side gears are rotatable about a first axis and a pair of pinion gears are rotatable about a second axis perpendicular to the first axis to constitute a differential device. Being rotatable about the first axis, the case is comprised of: an outer peripheral wall defined by a cylindrical surface that is rotationally symmetric about the first axis; a first side wall being perpendicular to the first axis and having a flange projecting outwardly from the cylindrical surface, the first side wall forming a unitary body with the outer peripheral wall; a second side wall having an outer side surface perpendicular to the first axis and being opposed to the first side wall, the second side wall forming a unitary body with the outer peripheral wall; a through hole penetrating the outer peripheral wall so dimensioned that a pinion shaft for rotatably supporting the pair of pinion shafts fits in the through hole along the second axis; and an opening opened on the outer peripheral wall so as to allow the side gears to be brought in the opening, the opening being so shaped as to project an irregular oval onto a plane including both the first axis and the second axis, the irregular oval having a center on an intersection of the first axis with the second axis, the irregular oval including a first arc furthermost in a periphery of the irregular oval from the center and a second arc so separated from the first arc as to allow the side gears to be brought in the opening, and the opening being so shaped that outlines of the pinion gears do not touch the periphery of the irregular oval in a case where an axis of the pinion gears is aligned with the center of the irregular oval.

DESCRIPTION

Exemplary embodiments will be described hereinafter with reference to FIGS. 1 through 5.

Throughout the following description and the appended claims, an axial direction is defined as a direction along a rotational axis of a differential device unless described otherwise. Further, while the top and the bottom, or the right and the left, are discriminated, this is merely for the convenience of explanation and therefore does not limit the described parts. Still further, while expressions such as "to receive torque" and "to output torque" are often used, they are merely for the purpose of illustration and the torque may be transmitted in a reverse direction against the direction in the description.

Figure 1:
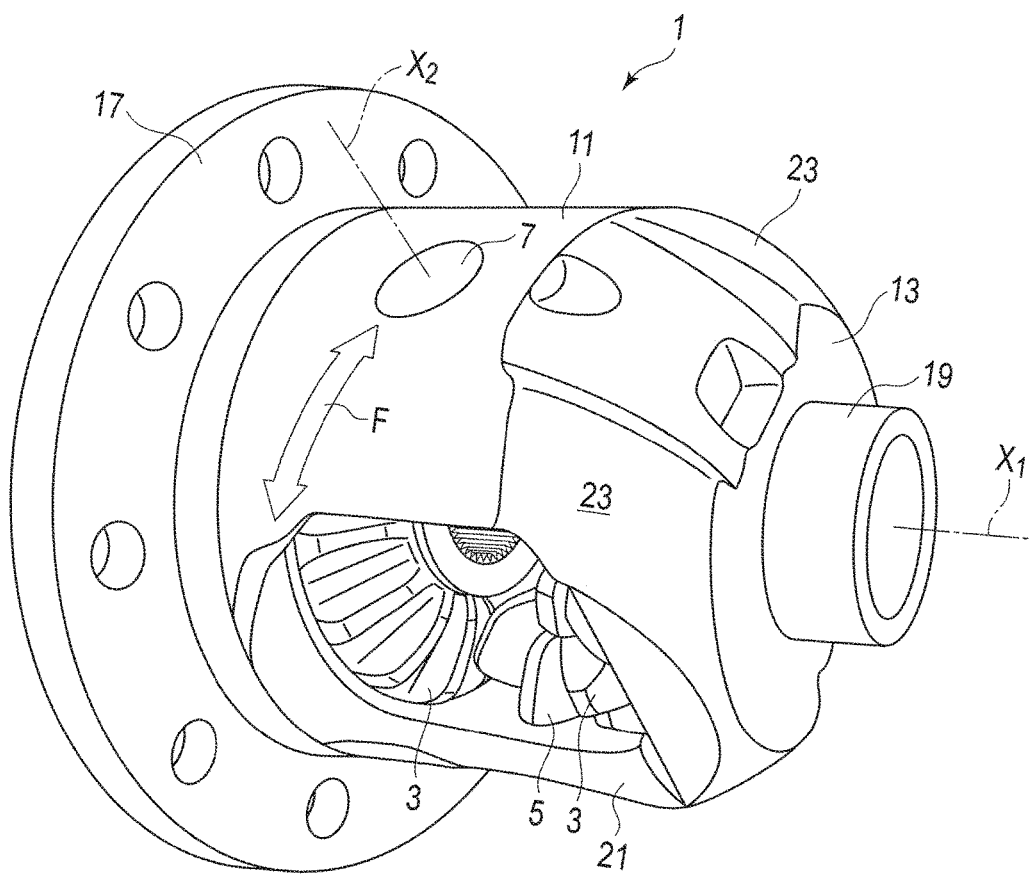
FIG. 1 is a perspective view of an example differential device.

Referring mainly to FIG. 1, a differential device is in general comprised of a differential case 1, a differential gear set constituted of gears 3, 5 housed therein, and a pinion shaft 7 secured to the differential case 1 to support the pinion gears 5. The differential device may contain a clutch for limiting its differential motion and any other device.

Figure 2:
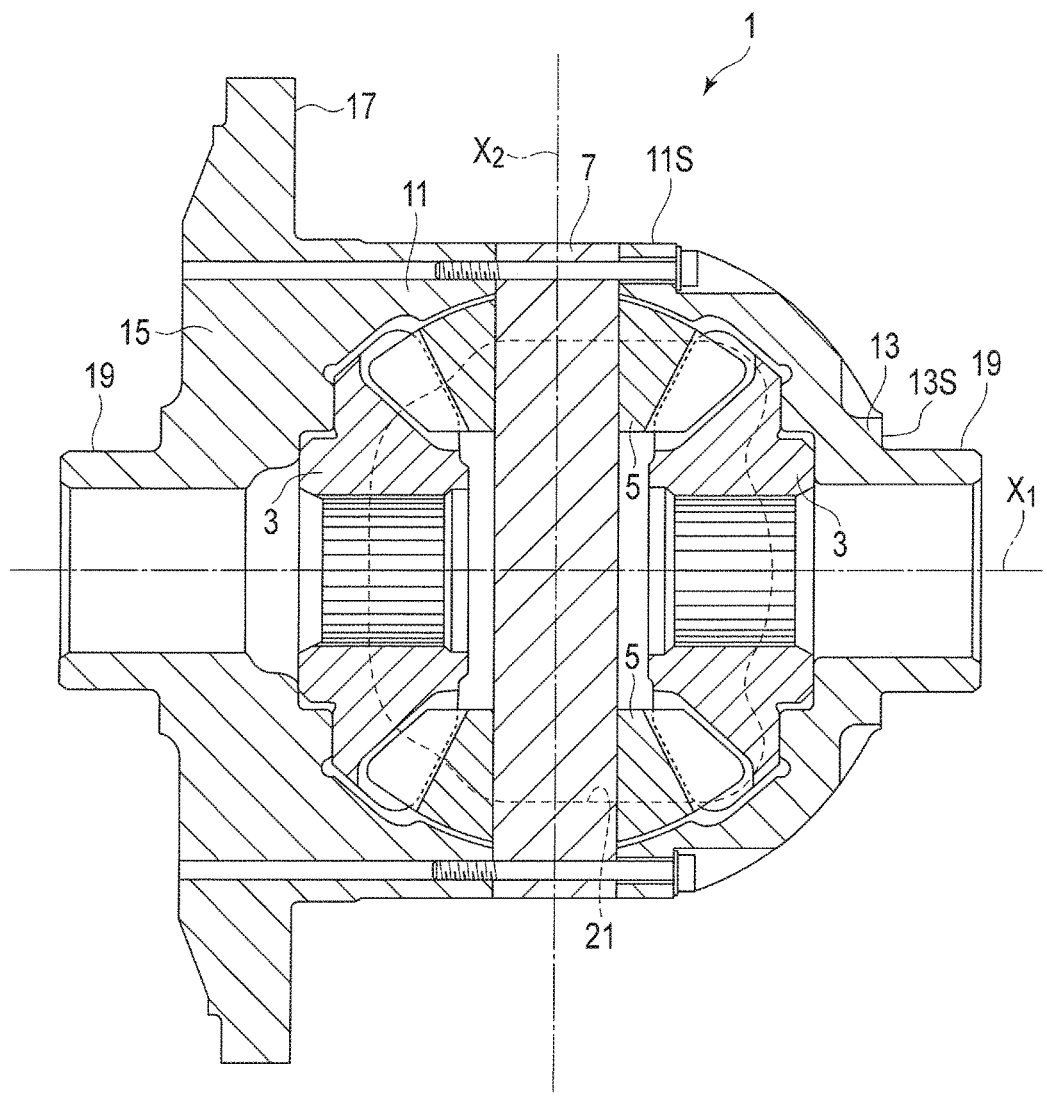
FIG. 2 is a cross sectional view of the differential device of FIG. 1, taken along a sectional plane passing through both a rotational axis of the differential device and a rotational axis of pinion gears.

Referring to FIG. 2 in combination with FIG. 1, the case 1 is generally constituted of an outer peripheral wall 11 generally forming a cylindrical shape about a rotational axis X1, and a pair of side walls 13, 15 generally perpendicular thereto, and the whole thereof forms a unitary body. The outer peripheral wall 11 and the side walls 13, 15 define a room for housing the differential gear set therein.

The outer peripheral wall 11 includes a cylindrical surface 11S rotationally symmetrical about the rotational axis X1. A surface of the side wall 13 is a plane 13S at least partly perpendicular to the rotational axis X1. From the opposite side wall 15, a flange 17 projects radially outwardly as a unitary body thereof from the cylindrical surface 11S and a ring gear for receiving torque is coupled thereto. This coupling may be established by any fasteners such as bolts, alternatively by welding, or by any other suitable means.

From the side walls 13, 15, boss portions 19 respectively project axially outwardly and are rotatably supported by a carrier. Specifically, the case 1 receives torque through the flange 17 and then rotates about the rotational axis X1.

The differential gear set generally includes a pair of side gears 3 rotatable about the rotational axis X1 and a pair of pinion gears 5 rotatable about a pinion axis X2 perpendicular to the rotational axis X1, which mesh with each other.

The side gears 3 are seated on internal faces of the case 1, respectively on sides toward the side walls 13, 15. As they can slide on the internal faces, they are rotatable about the rotational axis X1. Each side gear 3 is hollow and its internal surface is splined, for example, in order to couple with an output shaft.

The pinion shaft 7 may include separate pieces but is preferably of a single unitary body of a round-bar-like shape that penetrates and is fixed to the case 1 along the pinion axis X2, e.g., by a pin or a bolt for example. The pinion gears 5 are, as fitting on the pinion shaft 7, rotatably supported thereby.

Torque input to the case 1 is, via the pinion shaft 7, received by the pair of pinion gears 5, transmitted to the pair of side gears 3 meshing therewith, and output to the output shafts respectively combined therewith. The differential gear set allows differential motion between the pair of side gears 3.

The case 1 is comprised of an opening 21 for allowing the side gears to be brought in. The opening 21 penetrates the outer peripheral wall 11 in a direction perpendicular to both the axes X1, X2. The opening 21 is not necessarily one and only one opening, but another similar opening may penetrate the case 1 in a symmetric fashion about the rotational axis X1 in order to achieve a weight balance. The latter opening is preferably identical in shape to the opening 21 but may differ in shape therefrom as long as the weight balance can be achieved.

Figure 3:
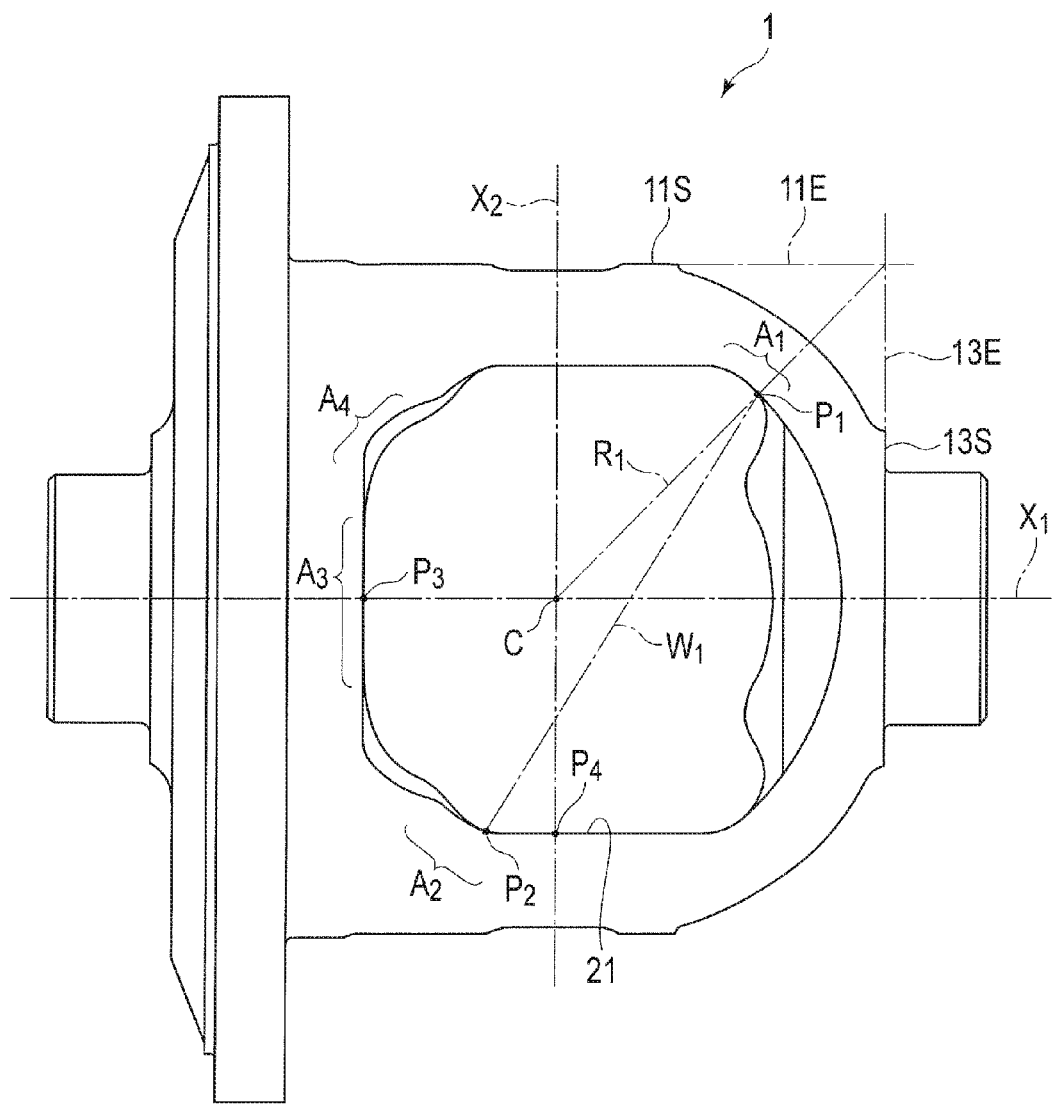
FIG. 3 is a plan view of a case of the differential device of FIG. 1.

The shape of the opening 21 is critically important in this example. Referring mainly to FIG. 3, if the opening 21 is projected onto a plane including both the rotational axis X1 and the pinion axis X2, the opening 21 gives an appearance of an irregular oval having a center C on an intersection of the rotational axis X1 with the pinion axis X2. Explanations of the shape of the opening 21 will be made in regard to this irregular oval instead of the opening 21 for itself.

This oval may be also made symmetrical about the rotational axis X1 but is not symmetrical about the other axes, such as the pinion axis X2, and is further not rotationally symmetrical about the center C. This oval is in general smaller in radius at the side of the flange 17 and is larger in radius in any different direction. In particular, the oval is largest in radius along a radius R1 from the center C to an intersection of an extrapolation 11E of the cylindrical surface 11S with an extrapolation 13E of the side surface 13S. In more detail, where an intersection of the radius R1 with a periphery of the oval is a first intersection P1, a first arc A1 including the first intersection P1 is furthermost in the periphery of the irregular oval from the center C.

This shape, as described below, has little influence on the strength and the functions of the case 1. In the outer peripheral wall 11 of the case 1, a part around the flange 17 is a main part that bears the greatest stress in order to transmit the input torque to the pinion shaft 7. As the opening 21 does not expand into this part, the case 1 can have a sufficient strength. On the other hand, in the outer peripheral wall 11 of the case 1, as a part at the side further from the flange 17 than the pinion shaft 7 does not significantly contribute to transmission of the torque, it does not have much influence on the strength of the case 1. Furthermore, the internal surfaces of the case around the axis X1 are parts where the side gears 3 are seated; the opening 21 does not intrude into these parts even if the opening 21 is large in radius in the direction of the radius R1. Specifically, the fact that the opening 21 is formed in such a shape has little influence on the strength and the functions of the case 1. In the meantime, to reinforce the part around the first arc A1 in the case 1, the part 23 ranging from the outer peripheral wall 11 to the side wall 13 can be made larger in thickness.

Figure 4:
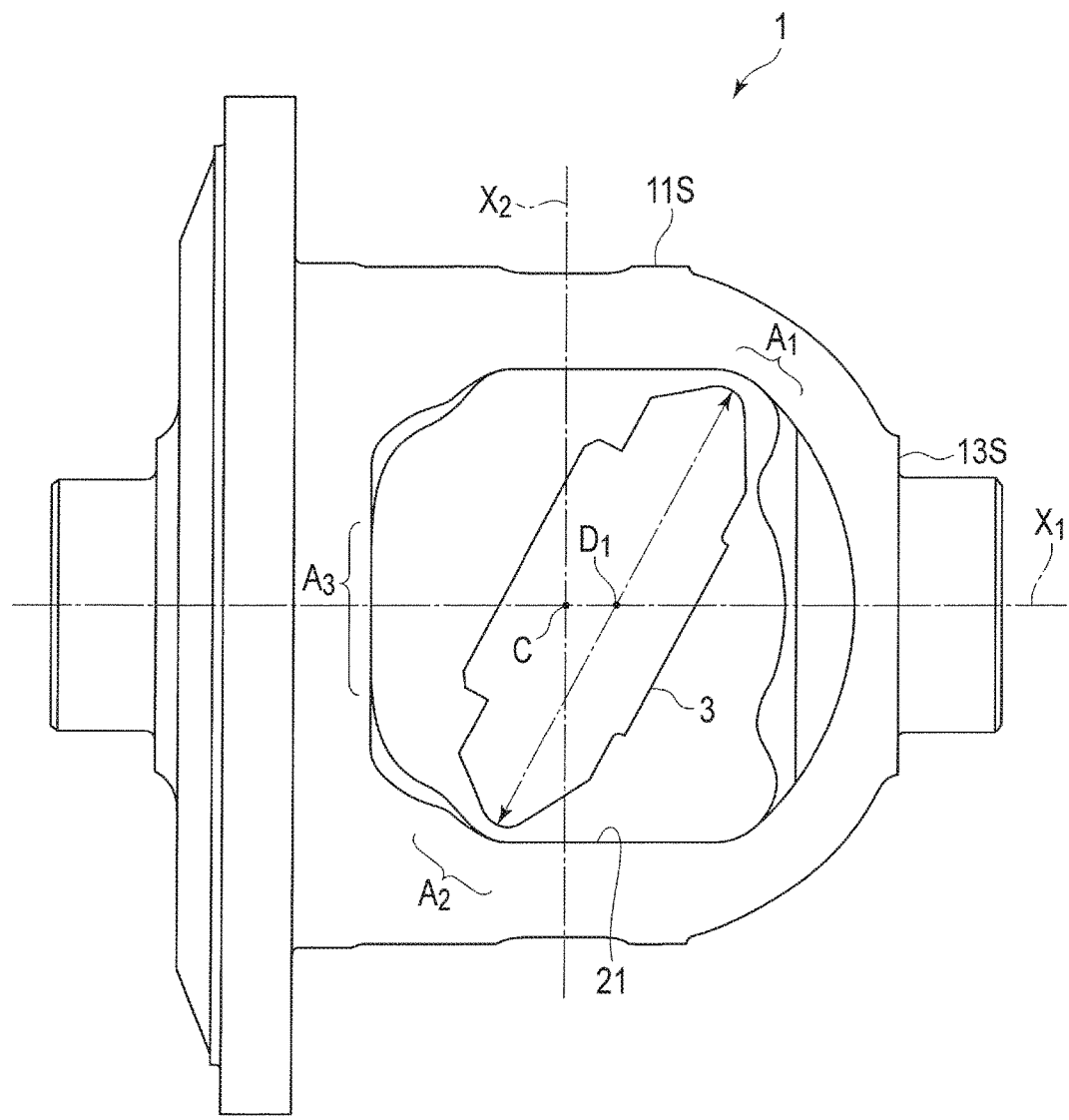
FIG. 4 is a plan view of the case of FIG. 4 schematically showing a process in which a side gear is brought therein.

Further, this oval includes a second intersection P2 or a second arc A2. When the first intersection P1 or the first arc A1 and the second intersection P2 or the second arc A2 are connected by a line segment W1, this line segment W1 should have a length sufficient to allow the side gears 3 to be brought in. Specifically, the second intersection P2 or the second arc A2 is apart in width from the first intersection P1 or the first arc A1 sufficiently to allow the side gears 3 to be brought in. As the opening 21 has such a shape, the side gears 4, by being properly tilted as shown in FIG. 4, are allowed to be brought therein. The length of the line segment W1 is preferably larger than the diameter D1 of the side gear 3.

The line segment W1 does not pass through the center C of the oval but the arcs A1, A2 are so positioned that the line segment W1 is closer to the second side wall 13 than the center C is. The oval, therefore, does not considerably expand toward the side adjacent to the first side wall 15. As being understood from FIG. 1, because the part to bear the stress F generated by the torque input to the flange 17 can be made wider, this shape prominently improves the strength of the case 1.

Referring again to FIG. 3, this oval includes a third arc A3 as being adjacent to the flange 17. Where an intersection of the third arc A3 with the rotational axis X1 is defined as a third intersection P3, the second arc A2 is further from the flange 17 than is the third arc A3. Further, where an intersection of the pinion axis X2 with the oval is defined as a fourth intersection P4, the second arc A2 is closer to the flange 17 than is the fourth intersection P4. These arrangements make the opening 21 apart from the flange 17 and also from the pinion shaft 7 so that the strength of the case 1 is prevented from being reduced.

The third arc A3 may be put as far away from the flange 17 as possible, and may be specifically closest to the center C in the periphery of the oval. Further the third arc A3 may be linear to intersect with the rotational axis X1 perpendicularly. This facilitates machining and further, eventually, contributes to improvement in machining accuracy.

Both end sections A4 thereof, namely the sections A4 respectively between the third arc A3 and the second arcs A2, may also trace arcs toward directions away from the flange 17. These fourth arcs A4 respectively intervene between the third arc A3 and the second arcs A2 so as to smoothly connect them. As the oval steps out of the part where the stress F generated by the input torque is transmitted, this shape notably improves the strength of the case 1.

Sections respectively between the arcs A1 and the arcs A2 may be also linear. Meanwhile, these sections and the arcs A1, A2, A3, A4 are definitely discriminable as they have distinct curvatures.

Figure 5:
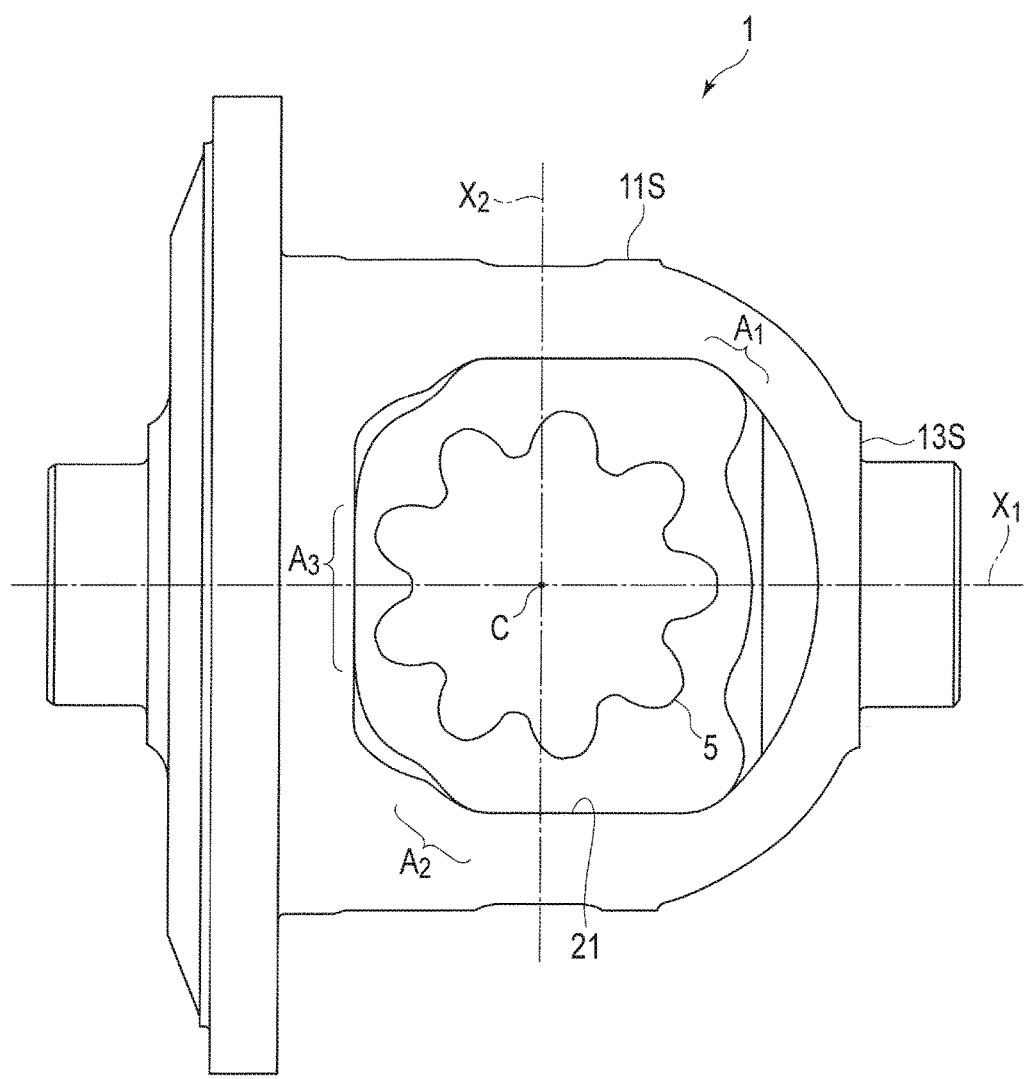
FIG. 5 is a plan view of the case of FIG. 4 schematically showing a process in which a pinion gear is brought therein.

Referring to FIG. 5, the whole of the oval is so shaped that a surface of the pinion gear 5 does not touch the periphery of the oval in a case where an axis of the pinion gear 5 is aligned with the center C. Specifically, even though the third arc A3 is closest to the center C in the periphery of the oval, the outline of the pinion gear 5 does not touch the third arc A3. Preferably the radius of the third arc A3 is larger than the radius of the pinion gear 5.

The differential device including the differential case 1 of the present example can be assembled in a way as described below.

In a state prior to the assembly, the interior of the case 1 is hollow as shown in FIG. 3. As shown in FIG. 4, as one of the side gears 3 is tilted and made to have its end pass by the second arc A2, this side gear 3 can pass through the opening 21 and be brought in the interior of the case 1. This side gear 3 is seated on the interior of the case 1 at the side of the flange 17, for example. The other side gear 3 is similarly made to pass through the opening 21 and is seated on the interior of the case 1 at the other side.

The pair of side gears 3 then makes the respective teeth partly exposed out of the opening 21. As shown in FIG. 5, one of the pinion gears 5 is put thereon so as to set itself in mesh with the exposed teeth. When properly in mesh, the axis of the pinion gear 5 is aligned with the center C. As described above, as the whole of the oval is so shaped that the surface of the pinion gear 5 does not touch its periphery when the axis of the pinion gear 5 is aligned with the center C, the pinion gear 5 can pass through the opening 21 in this state. Similarly the other pinion gear 5 is put in mesh with the pair of side gears 3.

When washers are respectively added to the pair of pinion gears 5 and the pinion gears 5 and the washers along with the side gears 3 are rotated about the rotational axis X1 at 90 degrees, the axis of the pinion gears 5 and the pinion axis X2 meet as shown in FIG. 2. The pinion shaft 7 is in this state inserted from the exterior into the case and then fixed by means of a bolt or such. After securing the pinion shaft 7 by the bolt or such, all of the side gears 3, the pinion gears 5, and accompanying elements are bound by the case 1 and mutual engagement and are thereby prevented from displacement from its original positions, thereby being retained in the case 1.

In general, by the aforementioned steps, the differential device can be assembled. As will be readily understood, assembly thereof is very easy.

As the torque input to the flange 17 is transmitted via the outer periphery 11 to the pinion shaft 7, as already described with reference to FIG. 1, great force F is generated along a spiral from the flange 17 toward the pinion shaft 7. According to the present embodiment, the part in the outer peripheral wall 11 between the flange 17 and the third arc A3 can be made sufficiently wide, and the arcs A4 of the opening 21 can be made to trace smooth arcs toward directions away from the flange 17. Specifically, as the opening 21 is so formed as to keep out of the spiral where the main force F passes, sufficient strength to bear the force F can be given to the outer peripheral wall 11. Further as the arcs A4 are smooth, no force concentration occurs around the opening 21. The opening 21 is, nevertheless, not small enough to prevent the gears from being brought therein but allows easy assembly as described above.

Although certain exemplary embodiments have been described above, modifications and variations of the embodiments described above will occur to those skilled in the art, in light of the above teachings.

The invention claimed is:

1. A case, housing a pair of side gears rotatable about a first axis and a pair of pinion gears rotatable about a second axis perpendicular to the first axis to constitute a differential device and to be rotatable about the first axis, the case comprising:

an outer peripheral wall defined by a cylindrical surface rotationally symmetric about the first axis;

a first side wall perpendicular to the first axis and including a flange projecting outwardly from the cylindrical surface, the first side wall forming a unitary body with the outer peripheral wall;

a second side wall including an outer side surface perpendicular to the first axis and being opposed to the first side wall, the second side wall forming a unitary body with the outer peripheral wall;

a through hole penetrating the outer peripheral wall, the through hole being so dimensioned that a pinion shaft for rotatably supporting the pair of pinion gears fits in the through hole along the second axis; and an opening opened on the outer peripheral wall so as to allow the side gears to be brought in the opening, the opening being so shaped as to project a pattern onto a plane including both the first axis and the second axis, the pattern having a center on an intersection of the first axis with the second axis, the pattern including a first arc furthermost in a periphery of the pattern from the center and a second arc so separated from the first arc as to allow the side gears to be brought in the opening, and the opening being so shaped that surfaces of the pinion gears do not touch the periphery of the pattern in a case where an axis of the pinion gears is aligned with the center of the pattern;

wherein the first arc is so positioned as to intersect a first radius from the center of the pattern to an intersection of an extrapolation of the cylindrical surface with an extrapolation of the outer side surface.

2. The case of claim 1, wherein the first arc and the second arc are so positioned that a line segment connecting the first arc with the second arc is closer to the second side wall than is the center of the irregular oval.

3. The case of claim 1, wherein the pattern includes a third arc closest in the periphery of the pattern to the center of the pattern.

4. The case of claim 3, wherein the second arc is so positioned as to be closer to the flange than an intersection of the second axis with the periphery of the pattern is and further from the flange than is the third arc.

5. The case of claim 1, wherein the pattern is non-angular.

6. A case, housing a pair of side gears rotatable about a first axis and a pair of pinion gears rotatable about a second axis perpendicular to the first axis to constitute a differential device and to be rotatable about the first axis, the case comprising:

an outer peripheral wall defined by a cylindrical surface rotationally symmetric about the first axis;

a first side wall perpendicular to the first axis and including a flange projecting outwardly from the cylindrical surface, the first side wall forming a unitary body with the outer peripheral wall;

a second side wall including an outer side surface perpendicular to the first axis and being opposed to the first side wall, the second side wall forming a unitary body with the outer peripheral wall;

a through hole penetrating the outer peripheral wall, the through hole being so dimensioned that a pinion shaft for rotatably supporting the pair of pinion gears fits in the through hole along the second axis; and an opening opened on the outer peripheral wall so as to allow the side gears to be brought in the opening, the opening being so shaped as to project a non-angular pattern onto a plane including both the first axis and the second axis, the pattern having a center on an intersection of the first axis with the second axis, the pattern including a first arc furthermost in a periphery of the pattern from the center and a second arc so separated from the first arc as to allow the side gears to be brought in the opening, and the opening being so shaped that surfaces of the pinion gears do not touch the periphery of the pattern in a case where an axis of the pinion gears is aligned with the center of the pattern;

wherein the pattern includes a third arc closest in the periphery of the pattern to the center of the pattern.

7. The case of claim 6, wherein the second arc is so positioned as to be closer to the flange than an intersection of the second axis with the periphery of the pattern is and further from the flange than is the third arc.

8. The case of claim 6, wherein the pattern is non-angular.

\* \* \* \* \*